United States Patent
Hanada et al.

(10) Patent No.: US 8,037,744 B2
(45) Date of Patent: Oct. 18, 2011

(54) METHOD FOR MEASURING DEFORMATION OF TIRE TREAD

(75) Inventors: Ryoji Hanada, Kanagawa (JP); Hideki Seto, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 463 days.

(21) Appl. No.: 12/374,998

(22) Filed: Jan. 23, 2009

(65) Prior Publication Data

US 2011/0056284 A1    Mar. 10, 2011

(30) Foreign Application Priority Data

Jan. 23, 2008   (JP) .................................. 2008-012183

(51) Int. Cl.
*G01M 17/02*       (2006.01)
(52) U.S. Cl. .......................... 73/146; 73/146.5
(58) Field of Classification Search .................. None
See application file for complete search history.

(56) References Cited

U.S. PATENT DOCUMENTS

| | | | |
|---|---|---|---|
| 2002/0166371 A1* | 11/2002 | Ratti et al. ................ | 73/146 |
| 2004/0216520 A1* | 11/2004 | Caretta ..................... | 73/146 |
| 2008/0243327 A1* | 10/2008 | Bujak et al. ............... | 701/29 |
| 2010/0013916 A1* | 1/2010 | Maehner ................... | 348/125 |
| 2010/0170331 A1* | 7/2010 | Maehner et al. .......... | 73/146 |
| 2011/0102811 A1* | 5/2011 | Kaneko et al. ........... | 356/625 |

FOREIGN PATENT DOCUMENTS

| | | |
|---|---|---|
| JP | 03-146809 | 6/1991 |
| JP | 05-196557 | 8/1993 |
| JP | 2002-522294 | 7/2002 |
| JP | 2004-196145 | 7/2004 |
| JP | 2007-132807 | 5/2007 |
| JP | 2007-263611 | 10/2007 |
| WO | WO 00/09348 | 2/2000 |

OTHER PUBLICATIONS

Yoshiharu Morimoto, et al. *Shape and Strain Measurement of 3-D Object Using Fourier Transform Grid Method*, IAPR Workshop on Machine Vision Applications, Nov. 28-30, 1990.

* cited by examiner

*Primary Examiner* — Andre Allen
(74) *Attorney, Agent, or Firm* — Knobbe Martens Olson & Bear LLP (57) ABSTRACT

A method for measuring deformation of a tire tread is provided. The method uses a tire tread deformation producing system 10 including a flat, transparent base plate 24 having first and second opposite surfaces 24a and 24b. The method also uses a vision system 12 including a pair of CCD cameras 30-1 and 30-2, which are positioned on the side of the second surface of the base plate. A test tire 14 has a tire tread having tread grooves 16. A portion of the tire tread of the test tire is urged against the first surface of the base plate. The three-dimensional shape of a groove wall surface of a tread groove of the test tire is measured by imaging the tread groove across the base plate by the CCD cameras while the test tire is subject to deformation.

9 Claims, 8 Drawing Sheets

METHOD FOR MEASURING DEFORMATION OF TIRE TREAD

TECHNICAL FIELD

The present invention relates to a method for measuring deformation of a tire tread.

BACKGROUND OF THE INVENTION

A typical vehicle wheel tire has a tire tread having tread grooves. When such a tire is rolling on the ground, the portion of the tire tread on and adjacent its ground contacting area is subject to deformation, which in turn causes deformation of the tread grooves so as to generate stresses and strains in the bottom and side walls of the tread grooves. In particular, those tires that have to bear relatively heavy loads, such as the tires for trucks and buses, may often experience cracks produced in the bottom walls of the tread grooves due to relatively large deformation of the grooves caused by such excessive loads. In order to prevent the tires from the damage caused by the cracks in the bottom walls of the tread grooves, it is important to configure the shape of the tread grooves such that the grooves have no site of strain concentration. For this purpose, it is desired to make precise measurements of deformation, and in particular of the deformed shape and/or the stress distribution, of the tire tread of a tire under the condition where the tire is subject to such deformation that is similar to that experienced when the tire is in actual use, i.e., when the tire tread is in contact with the ground surface with a certain load applied to the tire.

There have been proposed several precision measurement techniques for measuring the shape of a tire tread. Some of such known techniques use a laser triangulation unit to carry out non-contact precision measurement of the three-dimensional shape of a tire tread. An example of such techniques is described in Japanese Published Patent Application No. 2007-132807.

This and other known techniques, however, measure the shape of a tire tread when it is not in contact with any surface, and thus is not subject to deformation which could be produced under actual use conditions of the tire.

Under the circumstances, it is an object of the present invention to provide a method for measuring deformation of a tire tread, in which the deformation is similar to that experienced when the tire is in actual use and thus when the tire tread is in contact with the ground surface.

SUMMARY OF THE INVENTION

In accordance with one aspect of the present invention, there is provided a method for measuring deformation of a tire tread, comprising the steps of; providing a tire tread deformation producing system comprising a flat, transparent base plate having first and second opposite surfaces; providing a vision system comprising first and second imaging devices, said vision system being capable of measuring a shape of an object by (i) imaging the object across a transparent plate by said first and second imaging devices so as to generate first picture data from said first imaging device and second picture data from said second imaging device and (ii) processing said first and second picture data; providing a test tire having a tire tread having tread grooves defined by groove wall surfaces; positioning said first and second imaging devices on the side of said second surface of said base plate; producing deformation of the tire tread of the test tire by urging a portion of the tire tread against said first surface of said base plate with a desired load; and measuring the three-dimensional shape of a groove wall surface of a tread groove of the test tire by imaging the tread groove across said base plate by said first and second imaging devices while the test tire is subject to deformation.

In accordance with another aspect of the present invention, there is provided a method for measuring deformation of a tire tread, comprising the steps of; providing a tire tread deformation producing system comprising a flat, transparent base plate having first and second opposite surfaces; providing a vision system comprising first and second imaging devices, said vision system being capable of determining the three-dimensional positions of distinct points lying on a surface of an object by (i) imaging the object across a transparent plate by said first and second imaging devices so as to generate first picture data from said first imaging device and second picture data from said second imaging device and (ii) processing said first and second picture data; providing a test tire having a tire tread having tread grooves defined by groove wall surfaces; defining mesh points on a groove wall surface of a tread groove of the test tire; positioning said first and second imaging devices on the side of said second surface of said base plate; producing deformation of the tire tread of the test tire by urging a portion of the tire tread against said first surface of said base plate with a desired load; and determining the three-dimensional positions of said mesh points on the groove wall surface by imaging the tread groove across said base plate by said first and second imaging devices while the test tire is subject to deformation.

These and other features, objects and advantages of the present invention will become apparent upon reading the following description thereof together with reference to the accompanying drawings.

DETAILED DESCRIPTION OF THE INVENTION

Referring now to the accompanying drawings, a method for measuring deformation of a tire tread according to a preferred embodiment of the present invention will be described in more detail. In general, the method comprises a set of preparatory steps and a set of actual measurement steps. In the preparatory steps, a tire tread deformation producing system is provided which comprises a flat, transparent base plate. Also, a vision system is provided which comprises a pair of imaging devices, such as CCD cameras. Further, a test tire having a tire tread having tread grooves defined by groove wall surfaces is provided.

Figure 1:
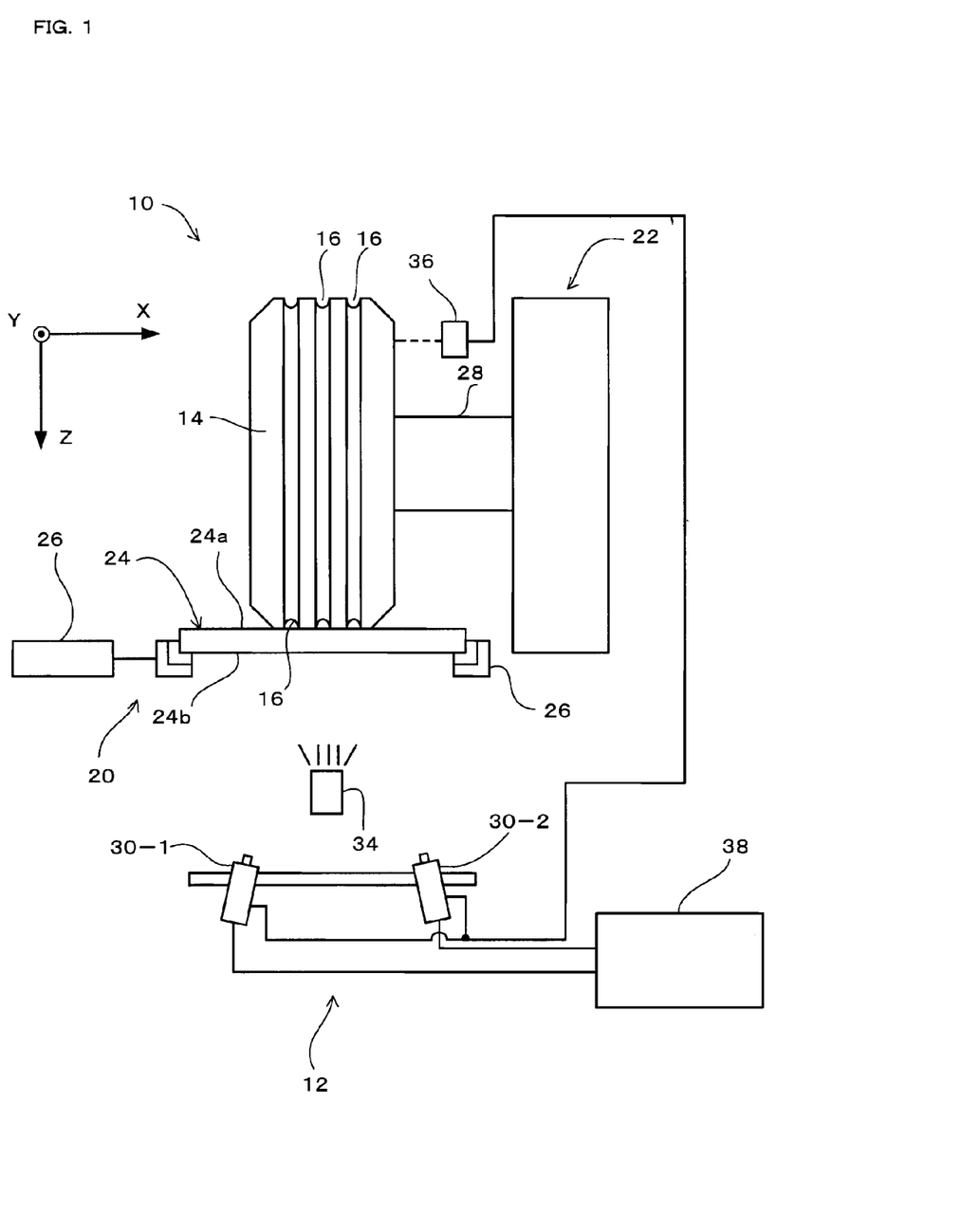
FIG. 1 is a schematic drawing of the arrangement for use in carrying out the method for measuring deformation of a tire tread in accordance with a preferred embodiment of the invention.
Figure 2:
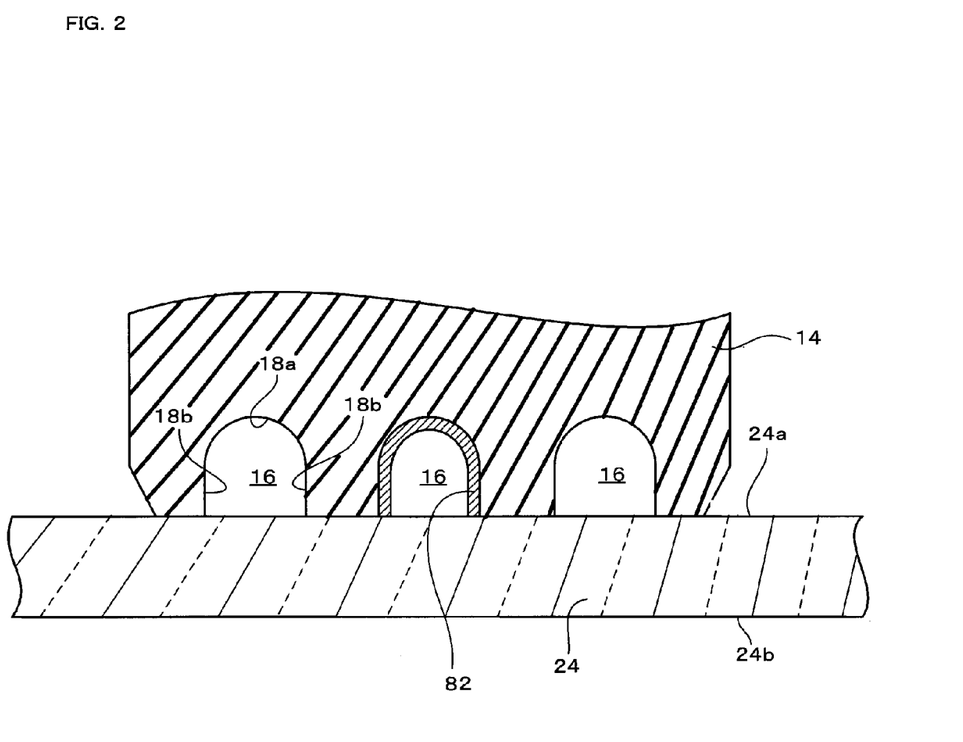
FIG. 2 is an enlarged fragmentary sectional view of a test tire and a base plate of FIG. 1, showing tread grooves in detail.

FIG. 1 is a schematic drawing of the arrangement for use in carrying out the method for measuring deformation of a tire tread in accordance with a preferred embodiment of the invention. FIG. 2 is an enlarged fragmentary sectional view of a test tire and a base plate of FIG. 1. As shown in FIG. 1, the arrangement includes a tire tread deformation producing system 10, a vision system 12, and a test tire 14. The test tire 14 has a tire tread having tread grooves 16 defined by the groove wall surfaces, including a rounded bottom wall surface 18a and a pair of side wall surfaces 18b, as best seen in FIG. 2. The test tire 14 is installed on a test wheel (not shown), which is in turn mounted on the tire tread deformation producing system 10.

The tire tread deformation producing system 10 serves to produce deformation of the tire tread of the test tire 14. More specifically, the tire tread deformation producing system 10 comprises a base plate driving stage 20 and a wheel manipulator 22 cooperating with the base plate driving stage 20. The base plate driving stage 20 comprises a movable base plate 24 having first and second opposite surfaces (i.e., a top surface 24a and a bottom surface 24b in the embodiment shown in FIGS. 1 and 2) and supported on a support and guide bed 26. The base plate 24 is a flat, transparent plate having an elongated strip-like shape, extending in the direction perpendicular to the sheet surface of the drawing of FIG. 1 (referred to as the "Y-direction" hereinafter). The base plate 24 has a sufficient strength to bear the load which may be applied thereto from the tire tread of the test tire 14. Suitable materials for the base plate 24 include, but are not limited to, strengthened glasses and acrylic resins. The support and guide bed 26 serves to support and guide the base plate 24 for sliding movement in the longitudinal direction thereof. (i.e., in the Y-direction). The base plate driving stage 20 further comprises a drive mechanism 26 (shown schematically with a block in FIG. 1) for driving the base plate 24 to move in the Y-direction at a variable, controlled speed.

The wheel manipulator 22 comprises a spindle 28 adapted for mounting thereon a test wheel for free rotation, as well as an internal mechanism (not shown) for causing translational movement of the spindle 28 in the direction perpendicular to the plane of the base plate 24 (referred to as the "Z-direction" hereinafter). During such translational movement, the spindle 28 is kept to extend in the direction perpendicular both to the y- and Z-directions (referred to as the "X-direction" hereinafter). The wheel manipulator 22 is capable of controlling the position of the spindle 28 in the Z-direction, as well as controlling the load applied from the spindle 28 to the test wheel mounted thereon.

In operation, the wheel manipulator 22 is controlled so as to urge the test wheel against the base plate 24, such that a portion of the tire tread of the test tire 14 installed on the test wheel is urged into contact with the first surface 24a of the base plate 24 so as to produce deformation of the tire tread of the test tire 14. During this operation, the wheel manipulator 22 is also controlled so as to apply a desired load to the test wheel, which load is in turn applied from the test tire 14 to the base plate 24 through the contact area between them. By selecting an appropriate load, the tread deformation thus produced can be similar to the deformation that may be experienced when the test tire is in actual use and thus is in contact with the ground surface. Further, during this operation, the base plate 24 may be either kept stationary or driven to move in the Y-direction. In the former case, the tread deformation of the test tire will simulate the deformation that may be experienced when the test tire is used for a vehicle and the vehicle stands still. In the latter case, the test tire 14 will roll on the first surface 24a of the base plate 24, so that the tread deformation of the test tire 14 will simulate the deformation that may be experienced when the tire is used for a vehicle and the vehicle is running.

The vision system 12 comprises first and second imaging devices 30-1 and 30-2, an illumination lamp 34, a photo sensor 36 serving as a trigger sensor, and a personal computer 38. The vision system 12 is capable of measuring a shape of an object in a non-contact manner. This is achieved by determining the three-dimensional positions of distinct points lying on a surface of an object, which is in turn achieved by (i) imaging the object across a transparent plate by the imaging devices 30-1 and 30-2 so as to generate first picture data from the first imaging device 30-1 and second picture data from the second imaging device 30-2 and (ii) processing the first and second picture data, as described later in more detail.

In the embodiment shown in the drawings, the imaging device 30-1 and 30-2 are CCD cameras. As is known, a CCD camera is a camera having a Charge Coupled Device as an imager. The CCD cameras 30-1 and 30-2 will be positioned and oriented for imaging a targeted tread groove 16 of the test tire 14 from different angles when actual measurement takes place, as described in more detail later. The illumination lamp 34 is used to provide illumination light suitable for imaging by the CCD cameras 30-1 and 30-2. The photo sensor 36 is used to detect a marking (not shown) formed on the rim of the test wheel so as to produce an output signal indicative of the moment of time when the rotating test wheel is at a predetermined angular position, so that the CCD cameras 30-1 and 30-2 may be triggered by the output signal to image the targeted tread groove 16 at that moment.

Figure 3:
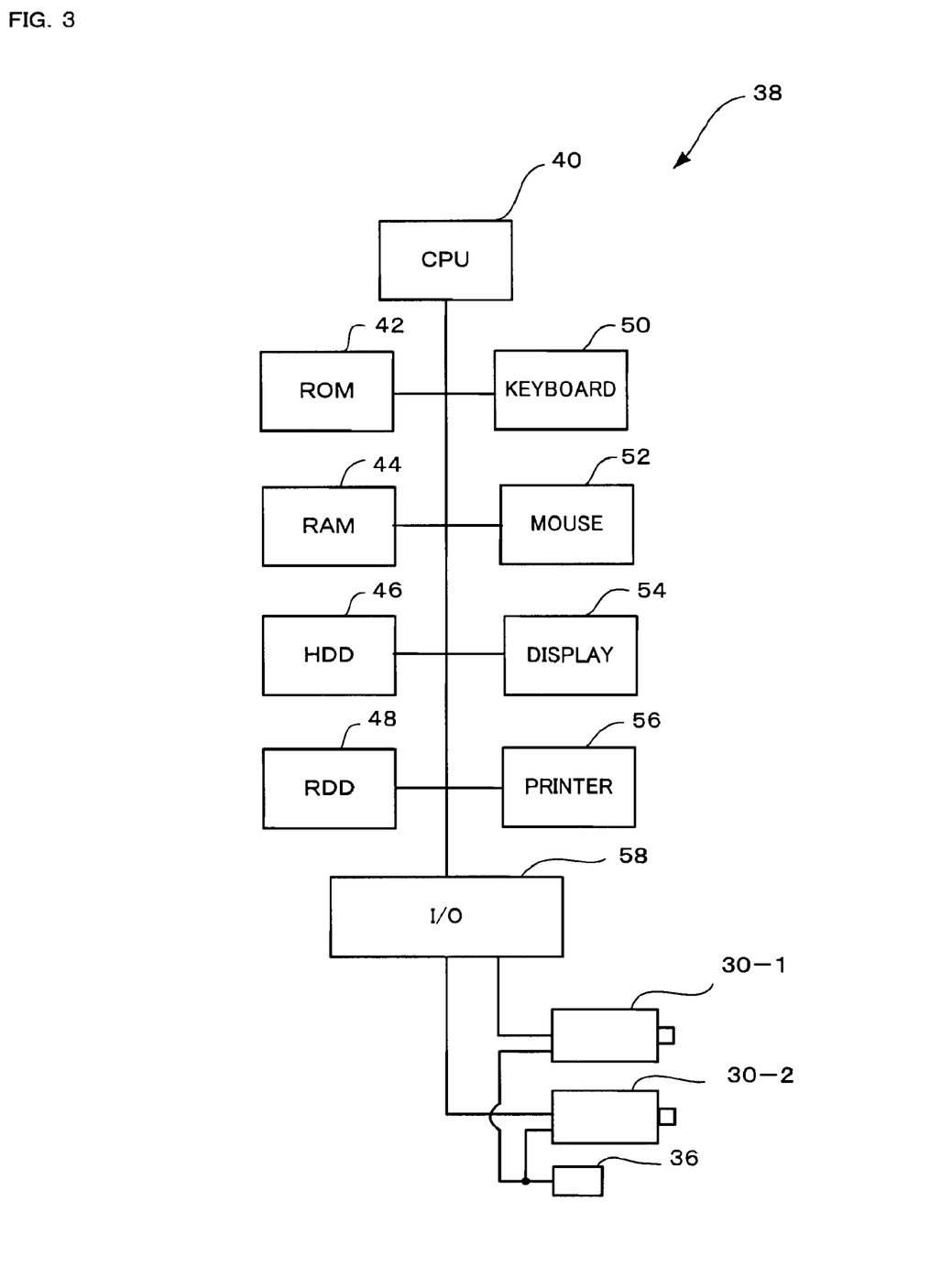
FIG. 3 is a block diagram showing a general configuration of a personal computer used in the arrangement of FIG. 1.

FIG. 3 is a block diagram showing the general configuration of the personal computer 38. The personal computer 38 comprises a central processing unit (CPU) 40, a read only memory (ROM) 42, a random access memory (RAM) 44, a hard disk drive (HDD) 46, a removable disk drive (RDD) 48, a keyboard 50, a mouse 52, a display unit 54, a printer 56, an input/output interface (I/O) 58, all of which are capable of communication with one another through appropriate interface circuitries (not shown) and bus lines. The ROM 42 is used to store control programs, while the RAM 44 is used to provide a working area. The hard disk drive 46 is used to store the program for carrying out the method according to the present invention. The removable disk drive 48 is used to write data to and/or read data from various removable disk media, such as CDs and DVDs. The keyboard 50 and the mouse 52 are used to allow the operator to perform data inputting operations. The display 54 has a screen for displaying output data, while the printer 56 provides a hard copy of output data. The I/O interface 58 is used to transmit data to and receive data from the CCD cameras 30-1 and 30-2, and more particularly, to receive picture data from the CCD cameras 30-1 and 30-2.

Figure 4:
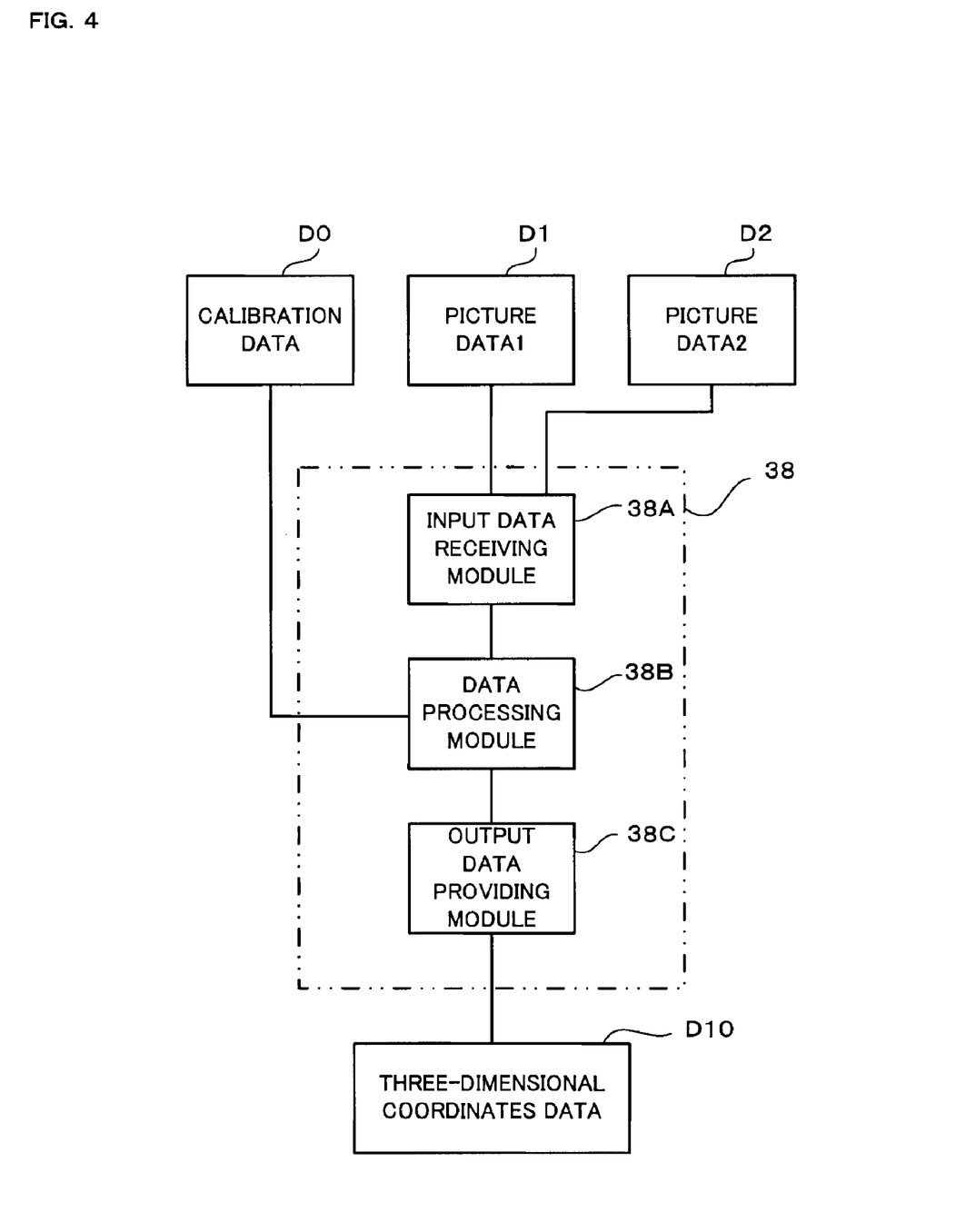
FIG. 4 is a functional block diagram showing functional modules of the personal computer of FIG. 3.

FIG. 4 is a functional block diagram showing functional modules of the personal computer 38. As shown, the personal computer 38 comprises three functional modules, including an input data receiving module 38A, a data processing module 38B and an output data providing module 38C. The input data receiving module 38A serves to receive any data required for measuring the three-dimensional shape of a tread groove of a test tire, which is described later in more detail. The data processing module 38B serves to process the received data so as to generate the three-dimensional coordinates data indicating the three-dimensional shape of the tread groove. This process is carried out by the CPC 40 prosecuting the program loaded into the RAM 44 from the hard disk drive 46. The output data providing module 38C serves to output the generated three-dimensional coordinates data. With the embodiment shown in the drawings, the function of the input data receiving module 38A is supported by the hardware including CPU 40, the keyboard 50, the mouse 52, the removable disk drive 48 and the input/output interface 58 together with related software. The function of the data processing module 38B is supported by CPU 40 together with related software. The function of the output data providing module 38C is supported by the hardware including the CPU 40, the display unit 54, the printer 56, the removable disk drive 48 and the input/output interface 58 together with related software.

In the actual measurement steps, the first and second imaging devices 30-1 and 30-2 are positioned on the side of the second surface 24b of the base plate 24 and oriented for imaging a targeted tread groove 16 of the test tire 14 from different angles. Then, the three-dimensional shape of a groove wall surface of the targeted tread groove 16 is measured by imaging the tread groove 16 across the base plate 24 by the first and second imaging devices 30-1 and 30-2 while the test tire 14 is subject to the deformation that is produced by the tire tread deformation producing system 10 as described above. Further, in a preferred embodiment of the present invention, this three-dimensional shape measurement is performed by defining mesh points on the groove wall surface and determining the three-dimensional positions of the mesh points, which determination is carried out by imaging the tread groove 16 across the base plate 14 by the first and second imaging devices 30-1 and 30-2 while the test tire 14 is subject to the deformation that is produced by the tire tread deformation producing system 10.

As described, in the method of the present invention, the three-dimensional shape measurement or the three-dimensional position determination is carried out by using a vision system 12. Although there have been proposed many vision-system-based three-dimensional shape measurement or position determination techniques, they have a disadvantage that they will lose precision when a transparent plate having a substantial thickness, such as the base plate 24 described above, exists between the vision system and the targeted object. The transparent plate will cause refraction of the light from the targeted object to the vision system, which in turn causes a shift of the light path, resulting in degradation in precision in the measurement or determination conducted by the vision system. In order to avoid such disadvantage, the present invention utilizes a unique vision-system-based three-dimensional measurement technique as described below.

Figure 5:
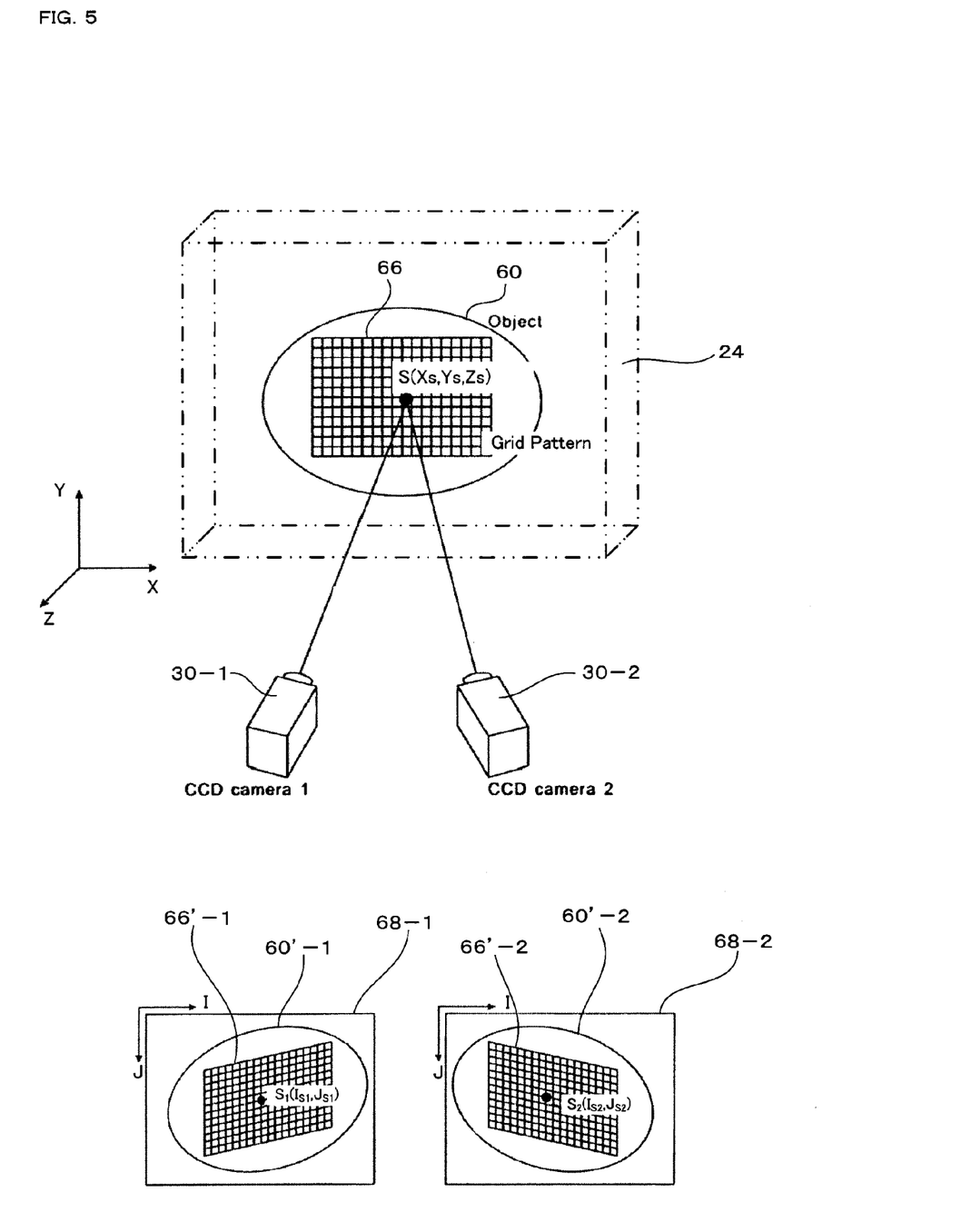
FIG. 5 is a schematic diagram illustrating the general concept of the three-dimensional shape measurement technique used in a preferred embodiment of the present invention.

The general concept of the three-dimensional shape measurement technique used in a preferred embodiment of the present invention is now described in detail with reference to FIGS. 5 and 6. In FIG. 5, an ellipse 60 schematically represents an object having a surface, whose three-dimensional shape is to be measured by the vision system comprising first and second CCD cameras 30-1 and 30-2. A transparent plate 24 is disposed between the object 60 and the CCD cameras 30-1 and 30-2. For the purpose of the three-dimensional shape measurement, a two-dimensional grid pattern 66 is formed on the surface of the object 60. The grid pattern 66 comprises two groups of parallel lines crossing one another so as to define a plurality of cross points distributed over the surface of the object 60. The cross points serve as mesh points defined on the surface of the object 60. The object 60 lies in the three-dimensional measuring space, so that we use an XYZ three-dimensional coordinate system to define any points lying in the measuring space.

FIG. 5 also shows a pair of rectangles 68-1 and 68-2, which schematically represent imaging planes of the CCD cameras 30-1 and 30-2, respectively, on which images 60'-1 and 60'-2 of the object 60 are formed. We also use an IJ two-dimensional coordinate system to define any points lying on each of the imaging planes 68-1 and 68-2. For each of the mesh points (such as a point S having three-dimensional coordinates ($X_S$, $Y_S$, $Z_S$)) lying on the surface of the object 60 and in the measuring space, the corresponding image points (such as image points $S_1$ and $S_2$) lying on the imaging planes 68-1 and 68-2 can be identified by analyzing the images 66'-1 and 66'-2 of the grid pattern 66 formed on the imaging planes 68-1 and 68-2, so that we can obtain the two-dimensional coordinates ($I_{S1}$, $J_{S1}$) and ($I_{S2}$, $J_{S2}$) of the image points $S_1$ and $S_2$ on the imaging planes 68-1 and 68-2.

Where the CCD cameras 30-1 and 30-2 have fixed positions and orientations with respect to the measuring space, there must be one-to-one correspondence between (i) the points (such as the point 5) lying in the three-dimensional measuring space and (ii) the pairs of the corresponding image points (such as the image points $S_1$ and $S_2$) formed on the imaging planes 68-1 and 68-2 of the CCD cameras 30-1 and 30-2.

This one-to-one correspondence is used to conduct the measurement of the three-dimensional shape of a surface of an object lying in a predetermined measuring space. For the measurement, at first we collect such data that are indicative of the relationship between (i) the three-dimensional coordinates ($X_S$, $Y_S$, $Z_S$) of each of three-dimensional lattice points distributed throughout within the measuring space and (ii) the pair of two-dimensional coordinates [($I_{S1}$, $J_{S1}$); ($I_{S2}$, $J_{S2}$)] of the pair of image points corresponding to each of the lattice point, which are formed on the image planes 68-1 and 68-2 of the CCD cameras 30-1 and 30-2 when a distinct point lying on each of the lattice point is imaged across the transparent base plate 24 by the CCD cameras 30-1 and 30-2. Such data are referred to as the "calibration data" hereinafter. For the measurement, we also define mesh points on the targeted surface of the object, which may be achieved, for example, by forming a two-dimensional grid pattern (such as one similar to the two-dimensional grid pattern 66 described above) on the targeted surface. Then, the object is positioned within the measuring space, and the targeted surface with the mesh points defined thereon is imaged across the transparent base plate 24 by the CCD cameras 30-1 and 30-2 so as to obtain picture data indicative of the images formed on the imaging planes 68-1 and 68-2 (such as those similar to the images 66'-1 and 66'-2 of the grid pattern 66). The picture data are then analyzed to identify pairs of the image points (such as the point $S_1$ and $S_2$) on the imaging planes 68-1 and 68-2, in which each pair of image points corresponds to one of the mesh points defined on the targeted surface of the object, and determine the two-dimensional coordinates ($I_{S1}$, $J_{S1}$) and ($I_{S2}$, $J_{S2}$) of each pair of image points $S_1$ and $S_2$. Thereafter, the two-dimensional coordinates ($I_{S1}$, $J_{S1}$ and ($I_{S2}$, $J_{S2}$) of each pair of image points $S_1$ and $S_2$ are used to search the calibration data, with the aid of interpolation technique if necessary of desired, so as to determine the three-dimensional coordinates of the position (in the measuring space) of the mesh point S that corresponds to that pair of image points $S_1$ and $S_2$. This analysis is repeated for other mesh points defined on the targeted surface. After the three-dimensional positions of sufficient number of the mesh points are determined, the three-dimensional shape of the targeted surface can be defined by the set of three-dimensional positions thus determined.

According to the measurement technique described above, the effect of refraction caused by the transparent base plate 24 and affecting the images taken by the CCD cameras 30-1 and 30-2 during the collection of the calibration data and the effect of refraction caused by the transparent base plate 24 and affecting the images taken by the CCD cameras 30-1 and 30-2 during the imaging of the targeted surface will cancel out each other, so that high precision in measurement is ensured.

Figure 6:
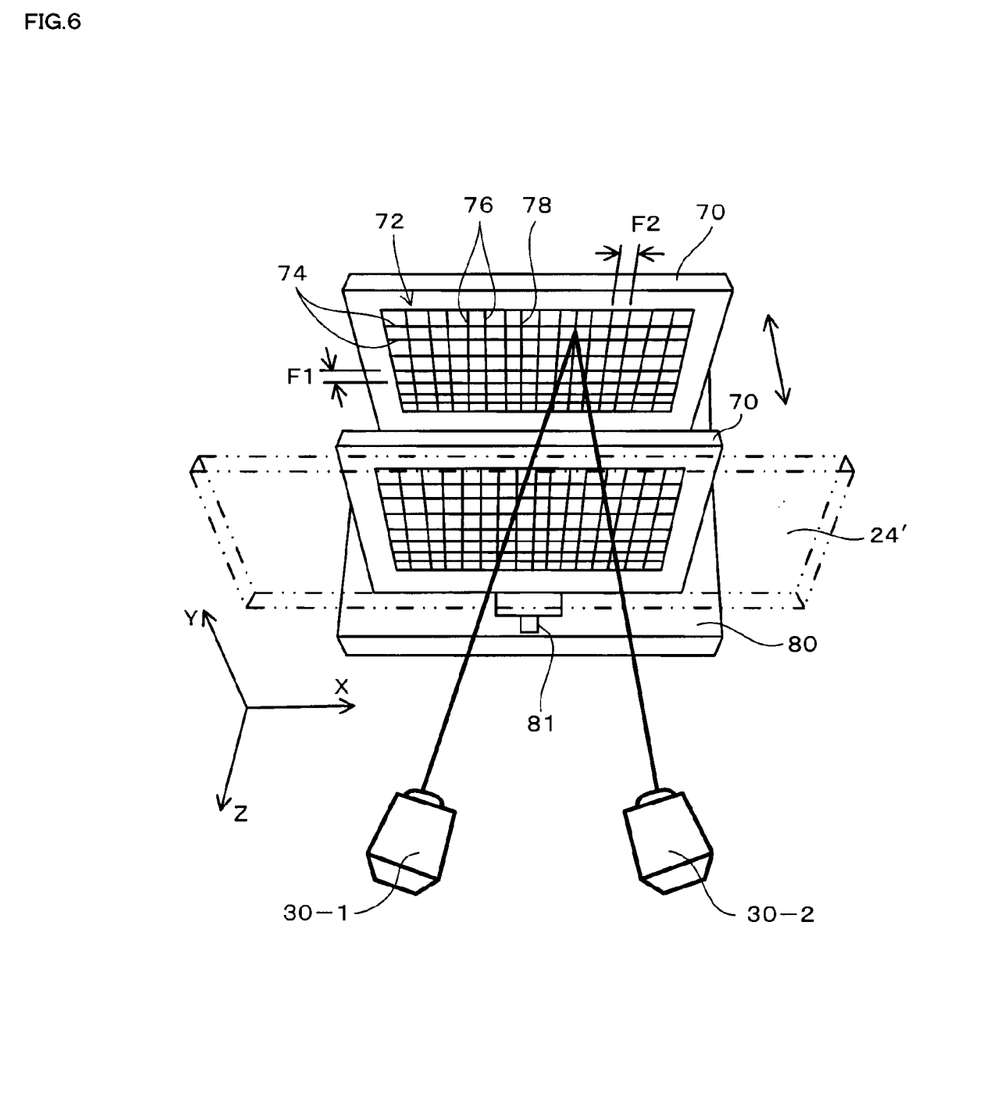
FIG. 6 shows a movable calibration board, a transparent plate and imaging devices, illustrating a calibration data collecting step according to a preferred embodiment of the present invention.

A preferred example of the calibration data collection step is described now in detail with reference to FIG. 6. In this step, a movable calibration board 70 is used. Although two boards are illustrated in FIG. 6, this is a schematic representation illustrating the movability of the calibration board 70, and actually only one calibration board 70 is used. The calibration board 70 has a front surface, on which a two-dimensional grid pattern 72 is formed. The grid pattern 72 comprises two groups of parallel lines, i.e., a first group of lines 74 and the second group of lines 76, crossing one another at right angles. The first group of lines 74 are at a fine, regular interval F1 and the second group of lines 76 are at the same regular interval F2=F1, so that the two groups of lines 74 and 76 define a plurality of fine squares, as well as a plurality of cross points 78 distributed in a two-dimensional fashion over the substantially entire area of the front surface of the calibration board 70. The cross points 78 serve as the mesh points on the calibration board 70, whose three-dimensional positions in the measuring space are determined and which are used to generate the calibration data, as described below. During the calibration data collection step, the movable calibration board 70 is supported by a calibration board manipulator 80 and is disposed within the measuring space above a transparent plate 24' (i.e., on the one side of the transparent 24'). The transparent plate 24' has the same thickness as the base plate 24 and the same refractivity as the base plate 24. Alternatively, the base plate 24 itself may be used as the transparent plate 24' for collecting the calibration data. The calibration board 70 is supported by the manipulator 80 such that its front surface is oriented to extend parallel to an XY-plane, the first group of parallel lines 74 are oriented to extend in the X-direction, and the second group of parallel lines 76 are oriented extend in the Y-direction. The manipulator 80 has a position sensor 81 for sensing the Z-position of the front surface of the calibration board 70. The calibration board 70 is moved by the manipulator 80 only in the Z-direction, with the X- and Y-positions of the parallel lines 76 and 78 being maintained unchanged. With this arrangement, by moving the calibration board 70 stepwise in the Z-direction with fine steps, the mesh points 78 on the front surface of the calibration board 70 can be positioned to the three-dimensional lattice points distributed throughout within the measuring space.

The CCD cameras 30-1 and 30-2, which are positioned under the transparent plate 24' (i.e., positioned on the other side of the transparent 24' than the measuring space), are then operated to image the grid pattern 72 so as to generate the corresponding picture data, which are subsequently analyzed to identify a pair of lines in the grid pattern 72, that are one of the first group of lines 74 and one of the second group of lines 76 forming each cross point 78. Because each line 74 in the first group has a known, unique Y-coordinate and each line 76 in the second group has a known, unique X-coordinate, the X- and Y-coordinates of the cross point 78 formed by the pair of lines are determined by identifying the pair of lines. In addition, the Z-coordinate of each mesh point (or cross point) 78, which is common to all the cross points 78 in the same picture, is determined based on the output signal from the position sensor 81. By repeating the above procedure with the Z-position of the calibration board 70 being changed stepwise, the three-dimensional coordinates ($X_S$, $Y_S$, $Z_S$) of the lattice points throughout within the measuring space are determined.

The above mentioned picture data comprise the output signals from the CCD cameras 30-1 and 30-2. Because the output signals from a CCD camera are signals generated at discrete points in the imaging plane (i.e., generated at pixels of the CCD imager), and the resolution of a CCD camera supported by the fineness of the pixels is limited, it is advantageous to use so-called "Two-Dimensional Fourier Transform Grid Method" in order to analyze the picture data from the CCD cameras 30-1 and 30-2 to identify each of the lines 74 and 76 and to determine the X- and Y-coordinates of each of the cross points with precision. This method is described in an article by Yoshiharu Morimoto, Li Tang, and Yasuyuki Seguchi, titled "Shape and Strain Measurement of 3-D Object Using Fourier Transform Grid Method" (MVA '90, IAPR Workshop on Machine Vision Applications Nov. 28-30, 1990, Tokyo, pp. 31-34), which is available at an Internet website having an URL "http://cvl.iis.u-tokyo ac.jp/mva/proceedings/CommemorativeDVD/1990/paper s/1990031.pdf". The disclosure of this article is incorporated herein by reference in its entirety.

The output signals from the CCD cameras 30-1 and 30-2 are also analyzed so as to determine the pair of two-dimensional coordinates [($I_{S1}$, $J_{S1}$); ($I_{S2}$, $J_{S2}$)] of the pair of image points corresponding to each of the lattice points, which are formed on the image planes of the CCD cameras 30-1 and 30-2. Then, (i) the three-dimensional coordinates ($X_S$, $Y_S$, $Z_S$) of each of the lattice points distributed throughout within the measuring space and (ii) the pair of two-dimensional coordinates [($I_{S1}$, $J_{S1}$); ($I_{S2}$, $J_{S2}$)] of the pair of image points $S_1$ and $S_2$ corresponding to each of the lattice points, which are formed on the image planes 68-1 and 68-2 of the CCD cameras 30-1 and 30-2, are correlated and stored in the hard disk drive 46 of the personal computer 38 as the calibration data.

Figure 7:
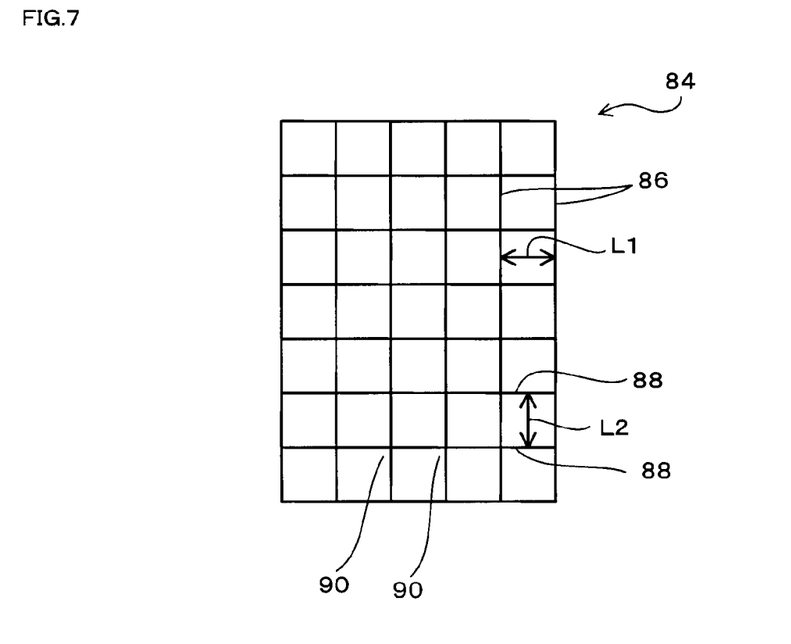
FIG. 7 illustrates a two-dimensional grid pattern formed on a rubber sheet used in a preferred embodiment of the present invention.
Figure 8:
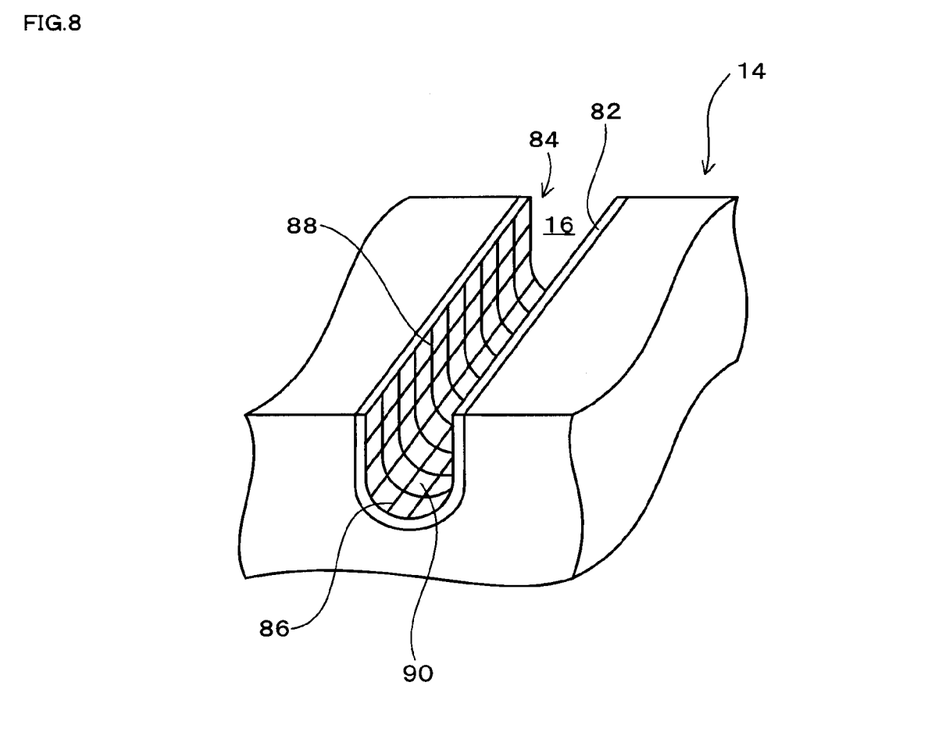
FIG. 8 is a fragmentary perspective view of a tire tread, partially broken away, showing the rubber sheet of FIG. 7 bonded on the bottom and side wall surfaces of a tread groove.

As referred to previously, in the method according to a preferred embodiment of the present invention, a two-dimensional grid pattern is formed on a groove wall surface, say, the bottom and/or side wall surfaces, of a tread groove in order to define mesh points on the groove wall surface. With reference to FIGS. 7 and 8, we will now described in detail a preferred example of the two-dimensional grid pattern which may be advantageously formed on a groove wall surface, as well as a preferred example of the step of forming such a two-dimensional grid pattern on a groove wall surface. In this step, a flexible, thin rubber sheet 82 is used, and a two-dimensional grid pattern 84 is formed on a first surface of the rubber sheet 82. The grid pattern 84 comprises two groups of parallel lines, i.e., a first group of lines 86 and the second group of lines 88, crossing one another at right angles. The first group of lines 86 are at a regular interval L1 and the second group of lines 76 are at the same regular interval L2=L1, so that the two groups of lines 86 and 88 define a plurality of squares, as well as a plurality of cross points 90 distributed in a two-dimensional fashion over the first surface of the rubber sheet 82.

The rubber sheet 82 may have a thickness of, for example, 0.1 mm to 0.5 mm. The grid pattern 84 may be formed by printing it on the first surface of the rubber sheet 82 with suitable paints, wherein the lines 86 and 88 are printed with a paint of one color (such as a black paint), while the square areas surrounded by the lines 86 and 88 are printed with a paint of another color (such as a white paint), resulting in that any and all partial areas of the first surface of the rubber sheet 82 are covered by the layers of one of the two paints. The paint layers of these paints are preferably formed to have the same thickness so that the outer surface of the printed rubber sheet, which is defined by the outer surfaces of the paint layers in different areas, will be completely flat. This advantageously contributes to an improvement in measurement precision in the subsequent step of measuring the three-dimensional shape of a groove wall surface using the rubber sheet 82.

The rubber sheet 82 having the grid pattern 84 formed on the first surface thereof is applied to a groove wall surface, say, the bottom and/or side wall surfaces, of a tread groove 16 by bonding the second surface of the rubber sheet 82 to the groove wall surface with a suitable adhesive. In this manner, the two-dimensional grid pattern 84 is advantageously formed on the groove wall surface of the tread groove 16.

When the rubber sheet 82 is bonded to the groove wall surface of the tread groove 16, it is oriented such that the first group of lines 86 of the grid pattern 84 extend in the circumferential direction of the test tire 14, while the second group of lines 88 of the grid pattern 84 extend in the direction perpendicular to the circumferential lines 86, as shown in FIG. 8. However, the directions of the lines 86 and 88 are not limited to those shown in FIG. 8. It is only required that each of the lines 86 and 88 can be identified in the pictures taken by the CCD cameras 30-1 and 30-2 by using a suitable method, such as the "Two-Dimensional Fourier Transform Grid Method" described above. By identifying two lines forming a cross point in each of the pictures taken by the CCD cameras 30-1 and 30-2, the pair of image points in the pictures that corresponds to the same cross point 90 can be identified, and the pair of two-dimensional coordinates of the pair of image points are determined. Then, the pair of two-dimensional coordinates are used to determine the three-dimensional position of the cross point 90 by using the above described measurement technique. Accordingly, the cross points 90 of the grid pattern 84 of the rubber sheet 82 bonded on the groove wall surface of the tread groove 16 serve as the mesh points defined on the groove wall surface.

The above described method for forming a grid pattern on the groove wall surface may be also used for forming a grid pattern on the front surface of the calibration board 70 if desired. Alternatively, the calibration board 70 may comprise an electronic display devise, such as a liquid crystal display, an organic electroluminescence display or others, and the grid pattern thereof may comprise a displayed grid pattern on the screen of the display device.

Figure 9:
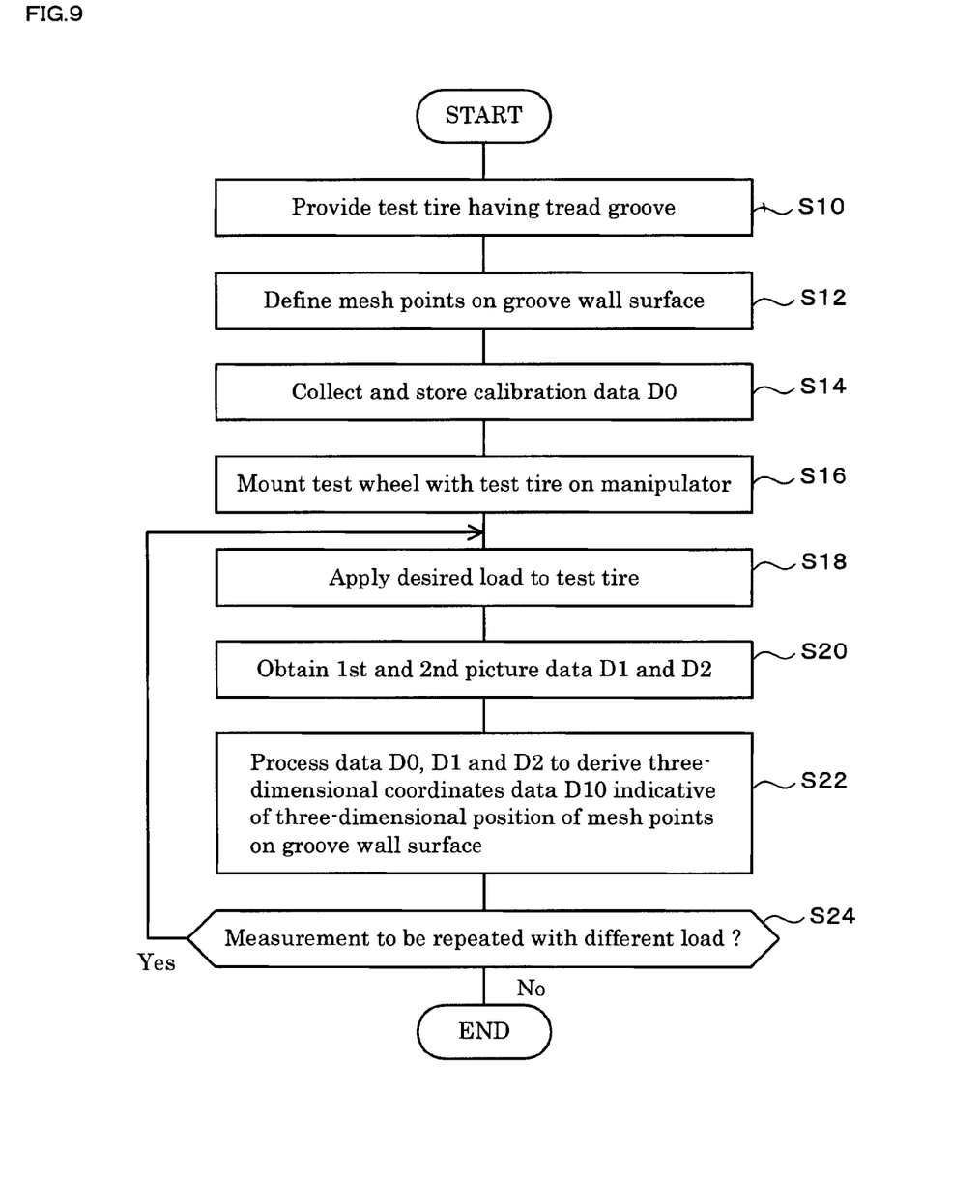
FIG. 9 is a flowchart illustrating the procedure of carrying out the method for measuring deformation of a tire tread according to a preferred embodiment of the present invention.

FIG. 9 shows a flowchart illustrating the procedure of carrying out the method for measuring deformation of a tire tread according to a preferred embodiment of the invention. The procedure uses the tire tread deformation producing system 10 and the vision system 12 shown in FIG. 1. To begin with, at step S10, a test tire 14 having tire tread having tread grooves 16 defined by groove wall surfaces is provided and installed on a test wheel. Then, at step S12, the rubber sheet 82 with the two-dimensional grid pattern 84 formed on its surface is bonded with a suitable adhesive to the bottom an/or the side wall surfaces of a targeted tread groove 16 of the test tire 14 so as to define mesh points on the groove wall surface. Then, at step S12, the calibration data D0 (see FIG. 4) are collected by using the calibration board 70 in the manner as described above. The collected calibration data are stored in the hard disk drive 46 of the personal computer 38.

At step S16, the test wheel with the test tire 14 installed thereon is mounted on the spindle 28 of the wheel manipulator 22. At step S18, the wheel manipulator 22 is operated to apply a desired load to the test tire 10. If the desired load is set to be zero, the tire tread only comes into contact with the first surface of the base plate 24, so that substantially no deformation of the tire tread, and thus of the tread groove 16, is produced. Otherwise, if the desired load is set to be non-zero, the tire tread is urged into contact with the first surface of the base plate 24 to produce deformation of the tire tread, and thus of the tread groove 16, depending on the applied load. At this point of time, the base plate 24 is kept stationary if the deformation of a tire tread to be measured is that which may be experienced when the wheel with the tire stands still. Otherwise, if the deformation of a tire tread to be measured is that which may be experienced when the wheel with the tire is rolling on the road surface, the base plate 24 is driven to move at a desired speed on the base plate driving stage 20.

At step S20, the CCD cameras 30-1 and 30-2 are operated to image the two-dimensional grid pattern 84 formed on the groove surface of the targeted tread groove 16 so as to obtain output signals from the CCD cameras 30-1 and 30-2. If the base plate 24 is then being driven so that the test tire 14 is rolling on the first surface of the base plate 24, the output signal of the trigger sensor 36 is used to trigger the CCD cameras 30-1 and 30-2 so as to image the targeted tread groove 16 when the rotating test wheel is at a predetermined angular position, as described above. The output signals thus obtained from the first and second CCD cameras 30-1 and 30-2 are the first and second picture data D1 and D2 (see FIG. 4), respectively, which are provided to the personal computer 38 through the input data receiving module 38A.

Then, at step 22, the first picture data D1, the second picture data D2 and the calibration data D0 are processed by the data processing module 38B (FIG. 4) so as to derive the three-dimensional coordinates data D10 indicative of the three-dimensional positions (in the measuring space) of the mesh points (i.e., the cross points 90 of the two-dimensional grid pattern 84) defined on the groove wall surface. These data D10 are then output by the data providing module 38C (FIG. 4).

At step 24, it is determined whether the measurement should be repeated with a different load applied to the test tire. If so, the process loops back to step S18 to repeat the procedure in steps S18 to S24. Otherwise, the process proceed to step S24 to end the procedure.

In a preferred example of a measurement schedule utilizing the above described method, the following procedure is carried out in order to analyze deformation of a tire tread of a test tire. At first, a first set of the three-dimensional coordinates data indicative of the positions of the mesh points 90 defined on a groove wall surface of a test tire 14 are acquired with the load applied to the test tire 14 set to be zero, or with no load applied to the test tire 14. Next, a second set of the three-dimensional coordinates data indicative of the positions of the same mesh points 90 are acquired with a certain, desired load applied to the test tire 14. Then, the three-dimensional positions of the mesh points indicated by the first set of data and those indicated by the second set of data are compared. The comparison shows both the deformation and the local strain of the groove wall surface of the tread groove, and thus of the tire tread. These results may be advantageously used, for example, for the purpose of improving designs of vehicle tires.

Various modifications and alterations may be made to the embodiments herein described without departing from the sprit and scope of the present invention. For example, the imaging devices used in the vision system are not limited to the CCD cameras. They may be so-called "CMOS cameras" or any other suitable types of cameras or imaging devices. Also, the method of defining mesh points on the groove wall surface of the tread groove is not limited to that described above. For example, the mesh points may be defined by printing, with a suitable paint, a two-dimensional grid pattern directly on the groove surface. Further, the measuring technique for measuring the three-dimensional shape of a groove wall surface of a tread groove is not limited to that described above. Any of the shape measuring techniques, in which precision measurement can be achieved by using imaging devices of a vision system so as to image a targeted object across a transparent plate, may be used for the method of the present invention. Such modifications and variations that may be apparent to a person skilled in the art are intended to be included within the scope of the invention as defined by the accompanying claims.

What is claimed is:

1. A method for measuring deformation of a tire tread, comprising the steps of:
   providing a tire tread deformation producing system comprising a flat, transparent base plate having first and second opposite surfaces;
   providing a vision system comprising first and second imaging devices, said vision system being capable of measuring a shape of an object by (i) imaging the object across a transparent plate by said first and second imaging devices so as to generate first picture data from said first imaging device and second picture data from said second imaging device and (ii) processing said first and second picture data;
   providing a test tire having a tire tread having tread grooves defined by groove wall surfaces;
   positioning said first and second imaging devices on the side of said second surface of said base plate;
   producing deformation of the tire tread of the test tire by urging a portion of the tire tread against said first surface of said base plate with a desired load; and
   measuring the three-dimensional shape of a groove wall surface of a tread groove of the test tire by imaging the tread groove across said base plate by said first and second imaging devices while the test tire is subject to deformation.

2. The method according to claim 1, wherein said step of producing a deformation of the tire tread of the test tire comprises the step of;
   urging a portion of the tire tread against said first surface of said base plate while moving said base plate so as to roll the test tire on said first surface of said base plate.

3. A method for measuring deformation of a tire tread, comprising the steps of:
   providing a tire tread deformation producing system comprising a flat, transparent base plate having first and second opposite surfaces;
   providing a vision system comprising first and second imaging devices, said vision system being capable of determining the three-dimensional positions of distinct points lying on a surface of an object by (i) imaging the object across a transparent plate by said first and second imaging devices so as to generate first picture data from said first imaging device and second picture data from said second imaging device and (ii) processing said first and second picture data;
   providing a test tire having a tire tread having tread grooves defined by groove wall surfaces;
   defining mesh points on a groove wall surface of a tread groove of the test tire;
   positioning said first and second imaging devices on the side of said second surface of said base plate;
   producing deformation of the tire tread of the test tire by urging a portion of the tire tread against said first surface of said base plate with a desired load; and
   determining the three-dimensional positions of said mesh points on the groove wall surface by imaging the tread groove across said base plate by said first and second imaging devices while the test tire is subject to deformation.

4. The method according to claim 3, wherein said step of producing a deformation of the tire tread of the test tire comprises the step of;
   urging a portion of the tire tread against said first surface of said base plate while moving said base plate so as to roll the test tire on said first surface of said base plate.

5. The method according to claim 3, wherein said step of defining mesh points on a groove wall surface of a tread groove of the test tire comprises the step of:
   forming a two-dimensional grid pattern on the groove wall surface, said two-dimensional grid pattern comprising two groups of parallel lines crossing one another so as to define a plurality of cross points distributed in a two-dimensional fashion on the groove wall surface, said cross points serving as said mesh points.

6. The method according to claim 5, wherein said step of forming a two-dimensional grid pattern on the groove wall surface comprises the steps of:
   forming said two-dimensional grid pattern on a thin, flexible sheet; and
   bonding said sheet on the groove wall surface.

7. The method according to claim 5, wherein said step of forming a two-dimensional grid pattern on the groove wall surface comprises the step of;
   printing, with a paint, said two-dimensional grid pattern on the groove wall surface.

8. The method according to claim 3, wherein said step of determining the three-dimensional positions of said mesh points comprises the steps of:
   collecting calibration data which is indicative of the relationship between (i) the three-dimensional coordinates of each of three-dimensional lattice points distributed throughout within said measuring space and (ii) the pair of two-dimensional coordinates of the pair of image points corresponding to each of said lattice points, which are formed on the image planes of said first and second imaging devices when a distinct point lying on each of said lattice points is imaged across said base plate by said first and second imaging devices; and
   determining the three-dimensional positions of said mesh points on the groove wall surface based on said calibration data together with said first and second picture data.

9. The method according to claim 8, wherein said step of collecting calibration data comprises the steps of:
   providing a movable calibration board having a front surface on which a two-dimensional grid pattern is formed, said two-dimensional grid pattern defining mesh points on said front surface of said calibration board;
   providing a transparent plate having the same thickness as said base plate and the same refractivity as said base plate; and moving said calibration board in a measuring space on one side of said transparent plate such that said mesh points on said front surface of said calibration board are positioned to three-dimensional lattice points distributed throughout within said measuring space;

disposing said first and second imaging devices on the other side of said transparent plate;

imaging said two-dimensional grid pattern on said calibration board across said transparent plate by said first and second imaging devices so as to obtain picture data indicative of the images of said two-dimensional grid pattern on said calibration board;

sensing the position of said calibration board;

analyzing said picture data and the sensed position of said calibration board so as to determine the three-dimensional coordinates of each of said lattice points;

analyzing said picture data so as to determine the pair of two-dimensional coordinates of the pair of image points corresponding to each of said lattice points, which are formed on the image planes of said first and second imaging devices.

* * * * *